United States Patent [19]

Nagao et al.

[11] Patent Number: 4,816,794

[45] Date of Patent: Mar. 28, 1989

[54] ELECTROMAGNETIC RELAY

[75] Inventors: Hirohumi Nagao; Kenichi Matsuo; Muneo Nakata, all of Iida, Japan

[73] Assignee: Omron Tateisi Electronics Co., Japan

[21] Appl. No.: 79,442

[22] Filed: Jul. 30, 1987

[30] Foreign Application Priority Data

| | | | |
|---|---|---|---|
| Jul. 30, 1986 | [JP] | Japan | 61-180527 |
| Jul. 30, 1986 | [JP] | Japan | 61-180528 |
| Jul. 30, 1986 | [JP] | Japan | 61-118055[U] |
| Jul. 31, 1986 | [JP] | Japan | 61-181431 |

[51] Int. Cl.⁴ ........................ H01M 67/02

[52] U.S. Cl. ........................ 335/136; 335/72

[58] Field of Search ........................ 335/202, 136–137, 335/121, 107, 109, 67–69, 71–72, 119, 184, 60, 267, 268, 78–85

[56] References Cited

U.S. PATENT DOCUMENTS

| | | | |
|---|---|---|---|
| 276,087 | 4/1883 | Smithers | 335/268 |
| 2,505,849 | 5/1950 | Bevis et al. | 335/267 |
| 2,611,012 | 9/1952 | Baker | 335/268 |
| 2,680,217 | 6/1954 | Hussey | 335/267 |
| 3,717,829 | 2/1973 | Flaherty | 335/202 |
| 3,893,194 | 7/1975 | Hayden et al. | 335/202 |

*Primary Examiner*—E. A. Goldberg
*Assistant Examiner*—Lincoln Donovan
*Attorney, Agent, or Firm*—Wegner & Bretschneider

[57] ABSTRACT

The electromagnetic relay has a pair of normally closed and normally open fixed terminals which are disposed opposing each other. At least two normally closed fixed contacts are mounted on the normally closed fixed terminal, and at least two normally open fixed contacts are mounted on the normally open fixed terminal. The normally closed and normally open fixed terminals are commonly used by a plurality of relay units. Therefore, the relay can be small enough to be installed on a small area, and allows high-density electric circuits to be provided on circuit boards.

9 Claims, 11 Drawing Sheets

ELECTROMAGNETIC RELAY

BACKGROUND OF THE INVENTION

This invention relates to an electromagnetic relay which has a plurality of relay units, and more particularly to an electromagnetic relay which has a pair of normally closed and normally open terminals on which at least two fixed contacts are mounted.

When a d.c. motor is rotated in alternate directions, two electromagnetic relays are required: one is for the clockwise direction and the other for the counterclockwise. This is also true for the case in which a polar solenoid is activated in alternate directions.

Conventional electromagnetic relays, however are separated from each other. Therefore, each conventional electromagnetic relay independently requires its own wiring pattern to provide an electric circuit for operating motors or polar solenoids in alternate directions. This results in complicated wiring patterns on a printed circuit board and requires a very long time and high cost to design them.

In addition, these separated electromagnetic relays independently require an area to be electrically insulated from the other electric components on the circuit board. This causes a large area to be used and hinders designers from providing high-density circuits. Moreover, since the relays independently require their own components, they are expensive.

SUMMARY OF THE INVENTION

It is, therefore, an object of this invention to provide an electromagnetic relay which allows simplified wiring patterns.

It is another object of this invention to provide an electromagnetic relay which allows the wiring patterns to be provided at low cost.

It is still another object of this invention to provide an electromagnetic relay which can be installed on a small area and allows high-density electric circuits on circuit boards.

It is still another object of this invention to provide an electromagnetic relay which itself can be manufactured at low cost.

According to this invention, there is provided an electromagnetic relay which includes at least two electromagnet devices, each having a coil device, a pair of normally closed and normally open fixed terminals which are disposed opposing each other, at least two normally closed fixed contacts mounted on the normally closed fixed terminal, at least two normally open fixed contacts mounted on the normally open fixed terminal, each of the normally open fixed contacts opposing each of the normally closed fixed contacts, and at least two movable contacts, each of which is reciprocated between the normally closed and open fixed contacts by activating and deactivating the electromagnet devices.

Figure 15:
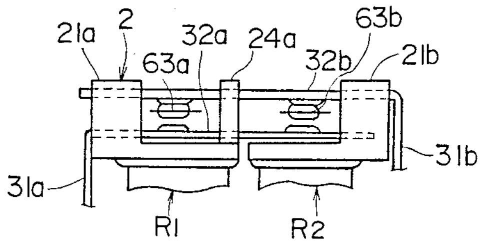
Figure 16:
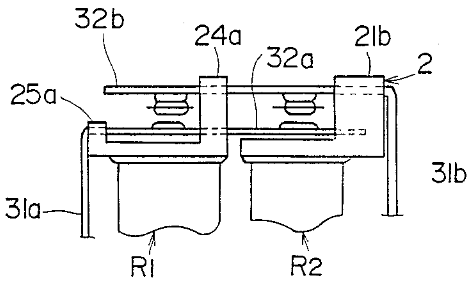
Figure 17:
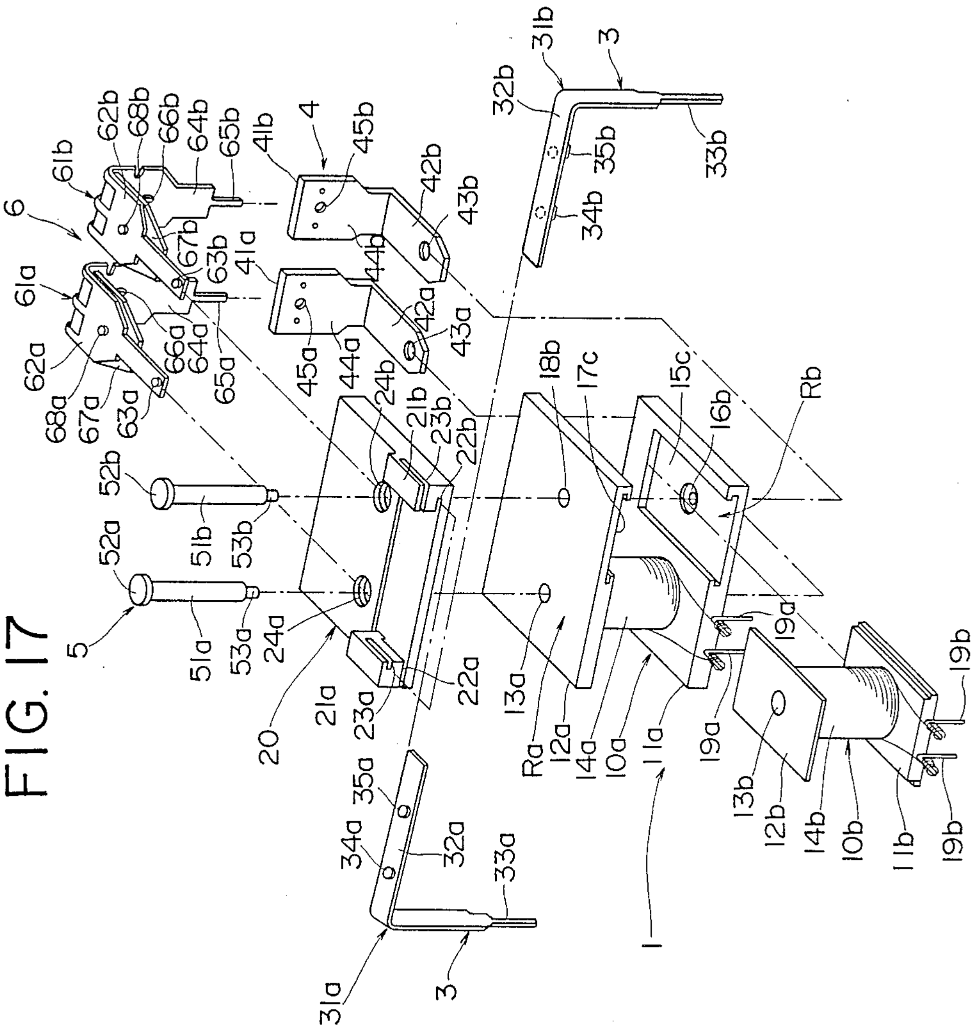
Figure 18:
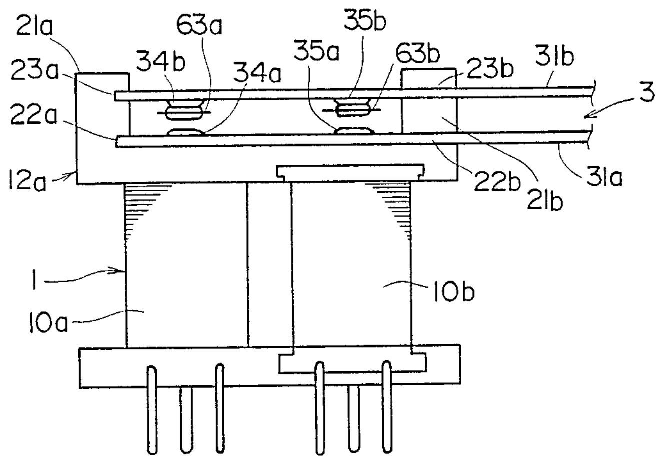
Figure 19:
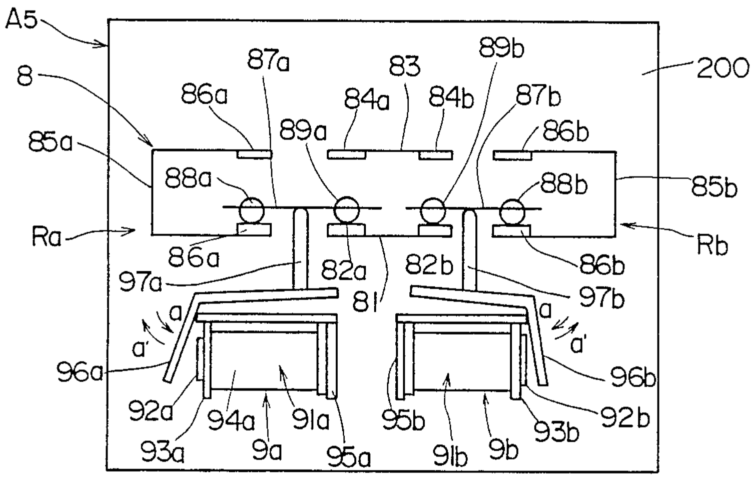
Figure 20:
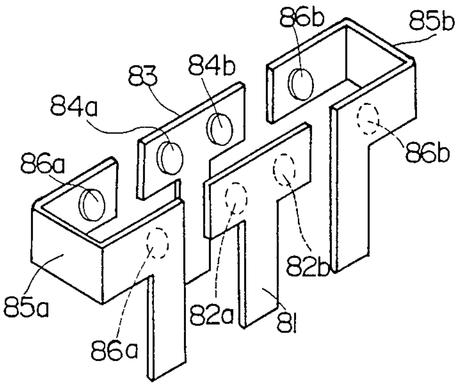
Figure 21:
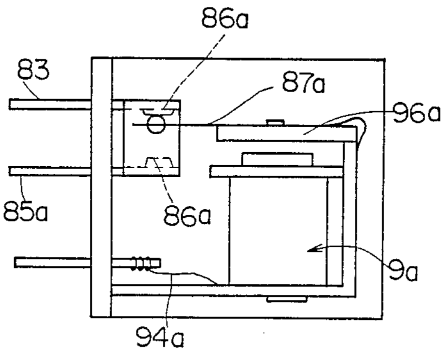
Figure 22:
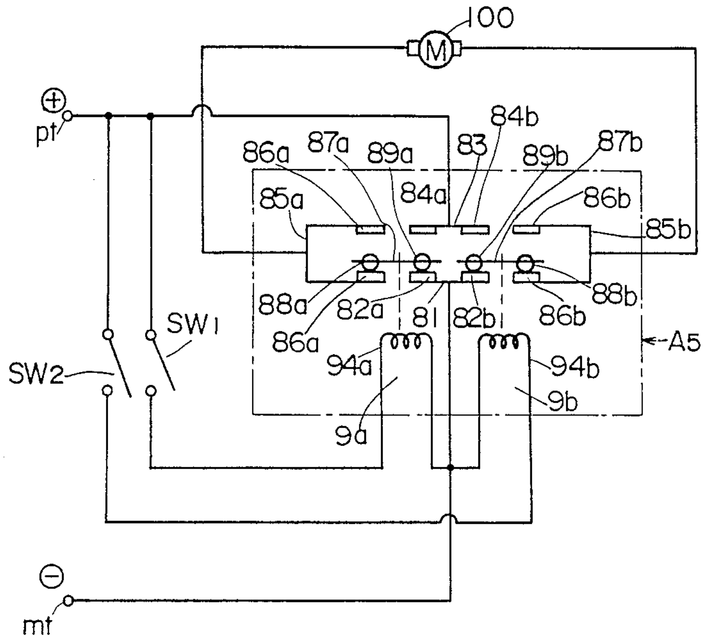
Figure 23:
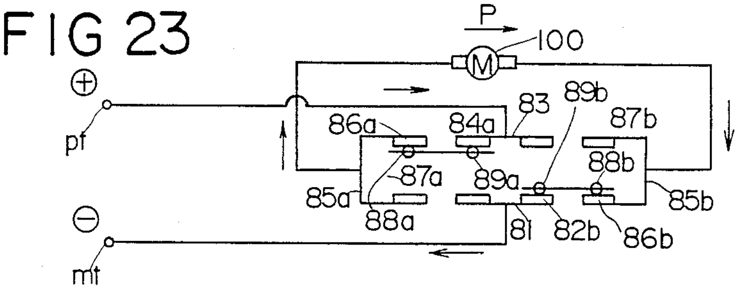
Figure 24:
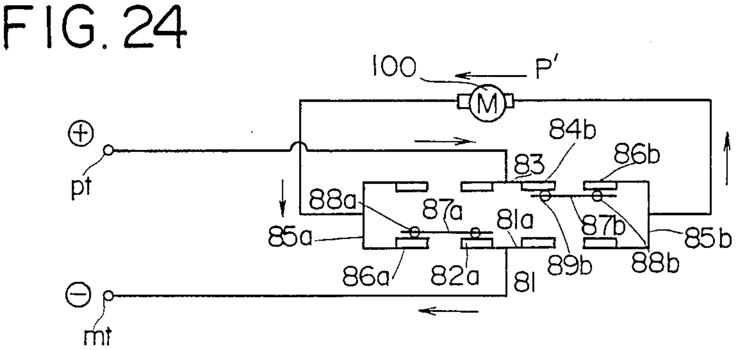

FIGS. **11*a* and 11*b*** shown an electromagnetic relay of a fifth embodiment of this invention;

FIGS. **12*a* and 12*b*** shown an electromagnetic relay of a sixth embodiment of this invention;

FIGS. **13*a* and 13*b*** shown an electromagnetic relay of a seventh embodiment of this invention;

FIGS. **14*a* and 14*b*** shown an electromagnetic relay of an eighth embodiment of this invention;

FIG. 15 is an electromagnetic relay of a ninth embodiment of this invention;

FIG. 16 is an electromagnetic relay of a tenth embodiment of this invention;

FIG. 17 is a perspective view of a disassembled electromagnetic relay of an eleventh embodiment of this invention;

FIG. 18 is a front view of an electromagnetic relay of a twelfth embodiment of this invention;

FIG. 19 is a schematic diagram of an electromagnetic relay of a thirteenth embodiment of this invention;

FIG. 20 is a perspective view of the fixed contacts used in the electromagnetic relay of FIG. 19;

FIG. 21 is a side view of an electromagnetic relay of a fourteenth embodiment of this embodiment;

FIG. 22 is an electric circuit configuration connected to a motor for illustrating an application of the electromagnetic relay of FIG. 19;

FIG. 23 is an electric circuit configuration for illustrating the operation of the electromagnetic relay of FIG. 22;

FIG. 24 is another electric circuit configuration for illustrating the operation of the electromagnetic relay of FIG. 22.

DESCRIPTION OF THE PREFERRED EMBODIMENTS

Figure 1:
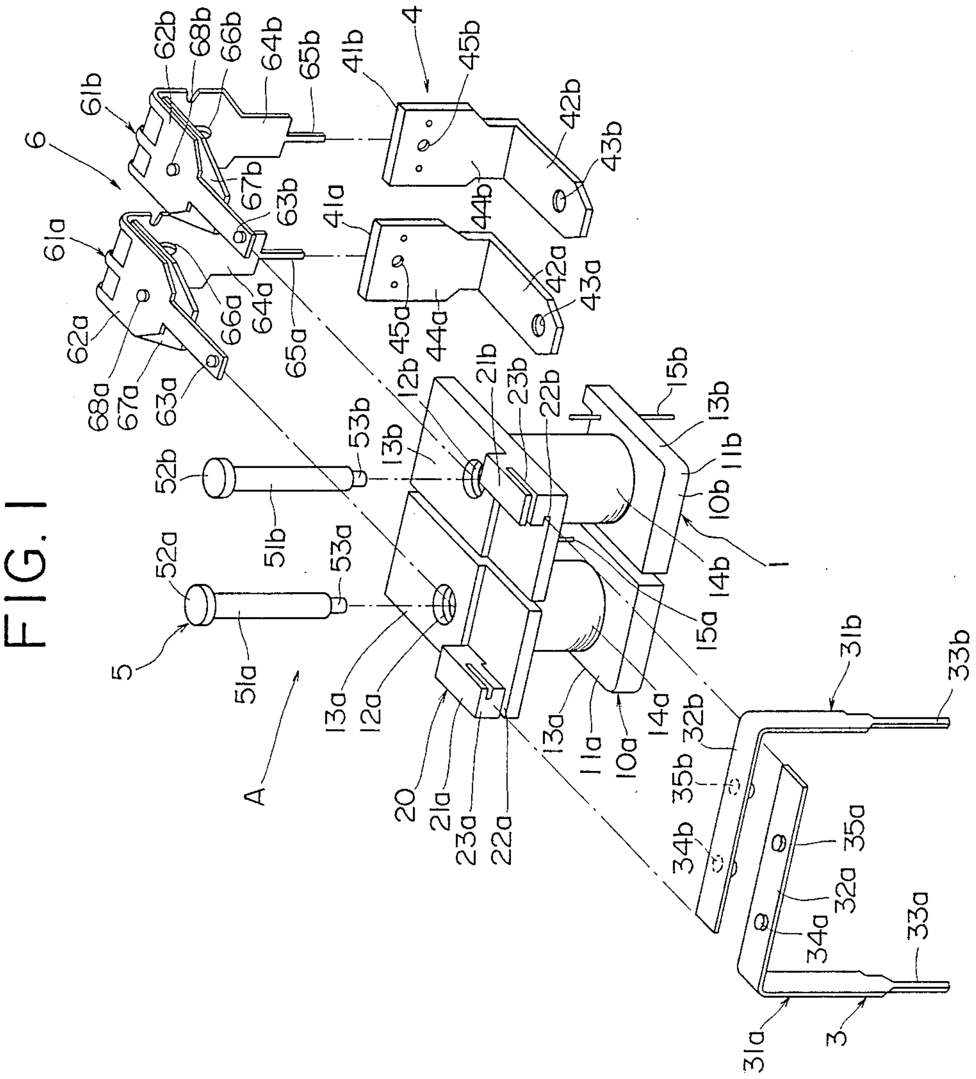
FIG. 1 is a perspective view of a disassembled electromagnetic relay of a first embodiment of this invention.
Figure 2:
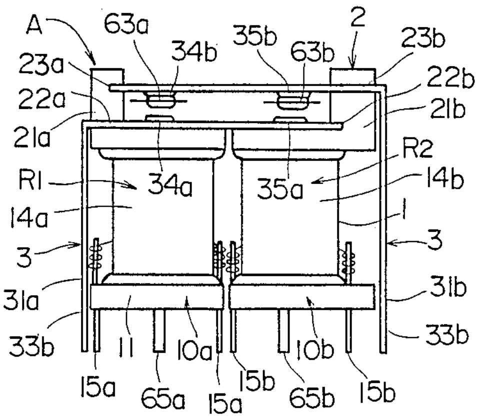
FIG. 2 is a front view of an electromagnetic relay of a first embodiment of this invention.

FIGS. 1 and 2 show an electromagnetic relay A as a first embodiment of this invention. [Whole Construction]

The electromagnetic relay A has an electromagnet unit 1, a fixed contact unit 3, a yoke unit 4, an iron core unit 5, and a movable unit 6. [The Electromagnet Unit]

The electromagnet unit 1 has two electromagnet devices **10*a* and 10*b*. The device 10*a* has a spool 11*a* which is made of a main frame 12*a*, and two flanges 13*a* and 13*a* formed at both ends thereof. A pair of coil terminals 15*a* and 15*a* is fixed to the lower flange 13*a*. Wound around the spool 11*a* is a coil 14*a* whose one end is connected to one of the coil terminals 15*a* and whose other end is connected to the other of the terminals 15***a*. The construction of the device 10*b* is the same as that of the device 10*a*. Formed on the front part of the upper flange 13*a* is a terminal base 21*a* which has two terminal grooves 22*a* and 23*a* paralleling each other. Also, A terminal base 21*b*, which has two terminal grooves 22*b* and 23*b* paralleling each other, is formed on the front part of the upper flange 13*b*. The terminal bases 21*a* and 21*b* form a terminal unit 20. [The Fixed Contact Unit]

The fixed contact unit 3 is made of inverted L-shaped normally open and closed fixed terminals 31*a* and 31*b*. The terminal 31*a* has two normally open fixed contacts 34*a* and 35*a* which are disposed on a flat portion 32*a* of the terminal 31*a*. The other terminal 31*b* has two normally closed fixed contacts 34*b* and 35*b* which are disposed on a flat portion 32*b* of the terminal 31*b*. The contact 34*a* opposes the contact 34*b* and the contact 35*a* opposes the contact 35*b*, respectively. [The Yoke Unit]

The yoke unit 4 is made of L-shaped yokes 41*a* and 41*b*, on the flat portions 42*a* and 42*b* of which iron core fixing openings 43*a* and 43*b* are formed, respectively. Perpendicular portions 44*a* and 44*b* have openings 45*a* and 45*b* to fix the movable unit 6 which is described hereinafter. [The Iron Core Unit]

This unit 5 has iron cores 51*a* and 51*b* which have respective magnetic pole surfaces 52*a* and 52*b* at the upper ends, and respective fixing tips 53*a* and 53*b* at the lower ends. [The Movable Unit]

The movable unit 6 is made of two inverted L-shaped resilient movable contact members 61*a* and 61*b*. The movable contact members 61*a* and 61*b* have flat portions 62*a* and 62*b* on which movable iron plates 67*a* and 67*b* are fixed by caulking protrusions 68*a* and 68*b* disposed on the flat portions 62*a* and 62*b*. Movable contacts 63*a* and 63*b* are disposed on the tips of the flat portions 62*a* and 62*b*. Perpendicular portions 64*a* and 64*b* have openings 66*a* and 66*b* and their lowest edges partly extend downwardly to form common terminals 65*a* and 65*b*. [*Assembly Procedure*]

The flat portions 42*a* and 42*b* of the yoke unit 4 are disposed on the lower surfaces of the flanges 13*a* and 13*b*. The fixing tips 53*a* and 53*b* of the iron cores 52*a* and 52*b* are inserted into the openings 43*a* and 43*b* through the main frames 12*a* and 12*b* and are caulked to make the electromagnet unit 1.

Next, the flat portions 32*a* and 32*b* of the normally open and normally closed terminals 31*a* and 31*b* are pressed into the grooves 22*a* and 22*b* of the terminal bases 31*a* and 31*b*, so that the fixed contacts 34*a* and 34*b* oppose the fixed contacts 35*a* and 35*b*, respectively.

The perpendicular portions 64*a* and 64*b* of the movable contact members 61*a* and 61*b* are disposed behind the yokes 41*a* and 41*b* in such a manner that the openings 66*a* and 66*b* face the openings 45*a* and 45*b*. Then, the movable contact members 61*a* and 61*b* are tightened to the perpendicular portions 64*a* and 64*b* respectively by screws, not shown, fixed into the openings 45*a*, 66*a*, 45*b*, and 66*b*. Consequently, as shown in FIG. 2, the movable contact 63*a* is not only disposed between the fixed contacts 34*a* and 34*b* but also contacted with the upper fixed contact 34*b* by the resilience of the movable contact member 61*a*. Also, the movable contact 63*b* is disposed between the fixed contacts 35*a* and 36*b*, and is contacted with the fixed contact 35*b* by the resilience of the movable contact member 61*b*. The iron plates 67*a* and 67*b* oppose the magnetic pole surfaces 52*a* and 52*b* of the iron cores 51*a* and 51*b*, respectively.

Thus, the electromagnet unit 1, the fixed contact unit 3, the yoke unit 4, the iron core unit 5, and the movable unit 6 are assembled to make the single electromagnetic relay A having two relay units $R_1$ and $R_2$ as shown in FIG. 2. [Operation]

The operation of the electromagnetic relay A will be described hereinafter referring to FIGS. 1 and 2. When a voltage is applied across the coil terminals 15*a* and 15*a* of the relay unit $R_1$, the iron core 51*a* is energized, thereby the movable iron plate 67*a* is attracted to the magnetic pole surface 52*a*, and the movable contact 63*a* breaks contact with the normally closed fixed contact 34*b* and contacts with the normally open fixed contact 34*a*. Thus, an electric circuit connecting the normally open fixed terminal 31*a* to the common terminal 65*a* is provided.

By contrast, when the iron core 51*a* is deactivated by cutting off the current to the coil 41*a*, the movable contact 63*a* returns upwardly to contact with the normally closed fixed contact 34*b* with the aid of the resilience of the movable contact member 61*a*, providing an electric circuit which connects the normally closed fixed terminal 31*b* to the common terminal 65*a*.

The operation of the relay unit $R_2$ is not described because it is the same as that of the relay unit $R_1$. [Application]

Figure 4:
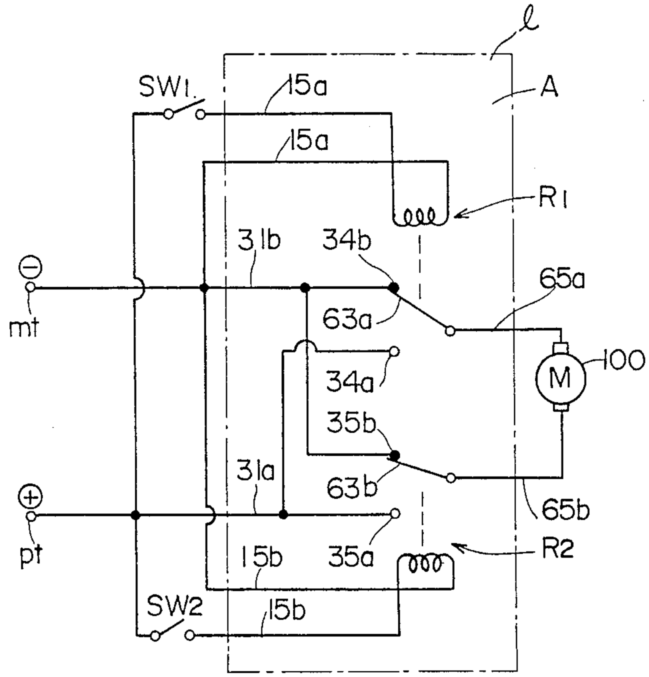
FIG. 4 is an electric circuit configuration connected to a motor for illustrating an application of the electromagnetic relay of FIG. 1.
Figure 5:
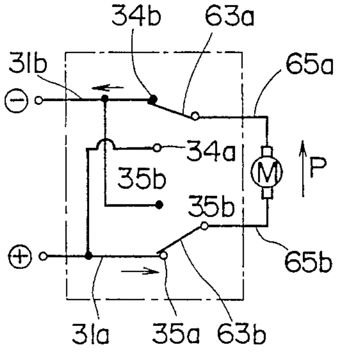
FIG. 5 is an electric circuit configuration for illustrating the operation of the electromagnetic relay of FIG. 4.
Figure 6:
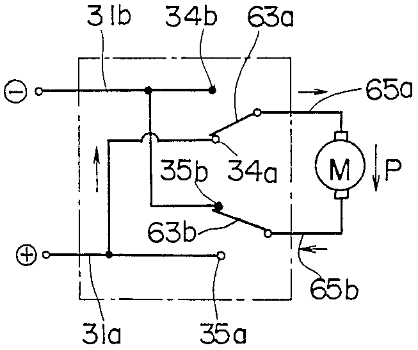
FIG. 6 is another electric circuit configuration for illustrating the operation of the electromagnetic relay of FIG. 4.

An application of the relay A will be described hereinafter referring to FIGS. 4 to 6. FIGS. 4 to 6 show an application in which the relay A (which is encompassed by a line 1) is used to rotate a d.c. motor 100 in alternate directions.

In FIG. 4, one of the coil terminals 15*a* and 15*a* of the relay unit $R_1$ is connected to the plus terminal pt of a d.c. power supply, not shown, via a switch $SW_1$, and the other is connected to the minus terminal mt. In addition, one of the coil terminals 15*b* and 15*b* of the relay unit $R_2$ is connected to the plus terminal pt via a switch $SW_2$, and the other is to the minus terminal mt. The normally closed fixed terminal 31*b* is connected to the minus terminal and the normally open fixed terminal 31*a* is to the plus terminal, respectively. The common terminal 65*a* of the relay units $R_1$ is connected to one pole of the motor 100 and the common terminal 65*b* of the relay unit $R_2$ is to the other pole.

As shown in FIG. 4, before the operation of the motor 100, both the switches $SW_1$ and $SW_2$ are turned off and the poles of the motor 100 are both short-circuited to the minus terminal. The two poles, however, are disconnected from each other when either $SW_1$ or $SW_2$ is turned on.

In operation, as shown in FIG. 5, when the switch $SW_2$ is turned on with the switch $SW_1$ turned off, the movable contact 63*b* of the relay unit $R_2$ breaks contact with the normally closed fixed contact 35*b* and contacts the normally open fixed contact 35*a*. Consequently, a current flows in direction P to rotate the motor 100 into the forward direction.

By contrast, as shown in FIG. 6, when the switch $SW_1$ is turned on with the switch $SW_2$ turned off, the movable contact 63*a* of the relay unit $R_1$ breaks contact with the normally closed fixed contact 34*b* and contacts the normally open fixed contact 34*a*, so that the current flows into the reverse direction P' to rotate the motor 100 into the opposite direction.

Figure 3:
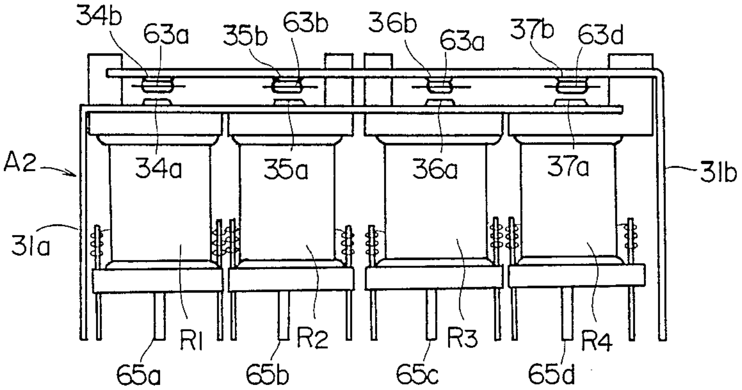
FIG. 3 is a front view of an electromagnetic relay of a second embodiment of this invention.

The electromagnetic relay A as the first embodiment has the two relay units $R_1$ and $R_2$. However, an electromagnetic relay $A_2$ as a second embodiment of this invention has four relay units $R_1$, $R_2$, $R_3$ and $R_4$ which have common normally open and normally closed fixed terminals 31*a* and 31*b* (FIG. 3). A movable contact 63*c* of the relay unit $R_3$ is reciprocated between fixed contacts 36*a* and 36*b*, and a movable contact 63*d* is between fixed contacts 37*a* and 37*b*, controlling a current flowing via common terminals 65*c* and 65*d*.

Figure 7:
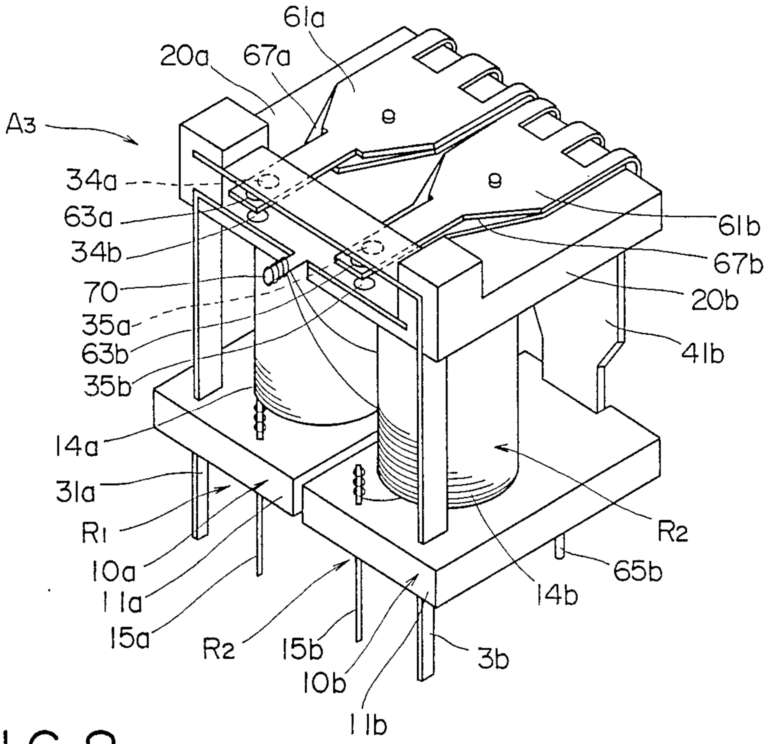
FIG. 7 is a perspective view of an electromagnetic relay of a third embodiment of this invention.

In the first and second embodiments, both ends of the coil 14*a* are connected to the coil terminals 15*a* and 15*a*, and those of the coil 14*b* are to the coil terminals 15*b* and 15*b*. However, as shown in FIG. 7, in an electromagnetic relay $A_3$ as the third embodiment of this invention, the normally open fixed terminal 31*a* has a coil connecting protrusion 70, to which one end of the coil 14*a* and that of the coil 14*b* are connected. Accordingly, the relay unit $R_1$ has only one coil terminal 15*a* and the unit $R_2$ has only one coil terminal 15*b*, so that the construction of the coil terminals is simple and the wiring can be easily performed.

Figure 8:
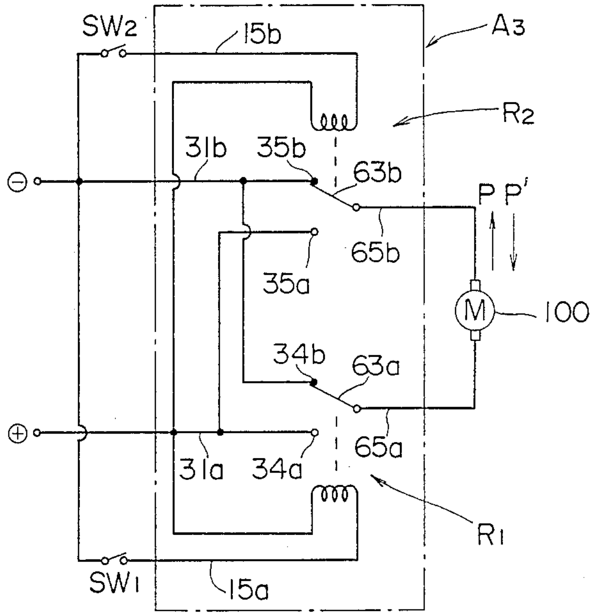
FIG. 8 is an electric circuit configuration of the electromagnetic relay of FIG. 7 which is connected to a motor.

An application of the relay $A_3$ will be described hereinafter referring to FIG. 8. FIG. 8 shows an electric circuit of the relay $A_3$ which is used to rotate the d.c. motor 100 in alternate directions.

When only the switch $SW_1$ is turned on, the movable contact 63*a* of the relay unit $R_1$ breaks contact with the normally closed fixed contact 34*b* and contacts the normally open fixed contact 34*a*, so that the current flows into the direction P to rotate the motor 100 into the forward direction.

On the contrary, when only the switch $SW_2$ is turned on, the movable contact 63*b* of the relay unit $R_2$ breaks contact with the normally closed fixed contact 35*b* and contacts with the normally open fixed contact 35*a*, so that the current flows into the reverse direction P' to rotate the motor 100 into the opposite direction.

Figure 9:
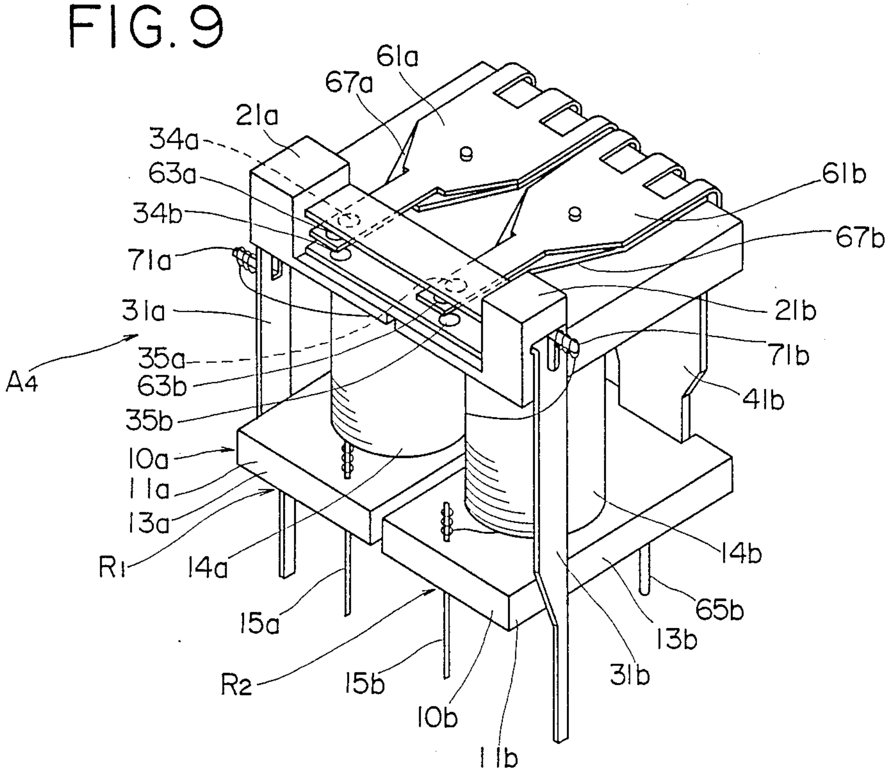
FIG. 9 is an electromagnetic relay of a fourth embodiment of this invention.

As shown in FIG. 9, in an electromagnetic relay $A_4$ as the fourth embodiment of this invention, the normally open fixed terminal 31*a* has a coil connecting protrusion 71*a*, and the normally closed fixed terminal 31*b* has a coil connecting protrusion 71*b*. One end of the coil 14*a* of the relay unit $R_1$ is connected to the protrusion 71*a*, and the other end is connected to the coil terminal 15*a*. Also, one end of the coil 14*b* of the relay unit $R_2$ is connected to the protrusion 71*b*, and the other end is connected to the coil terminal 15*b*.

Figure 10:
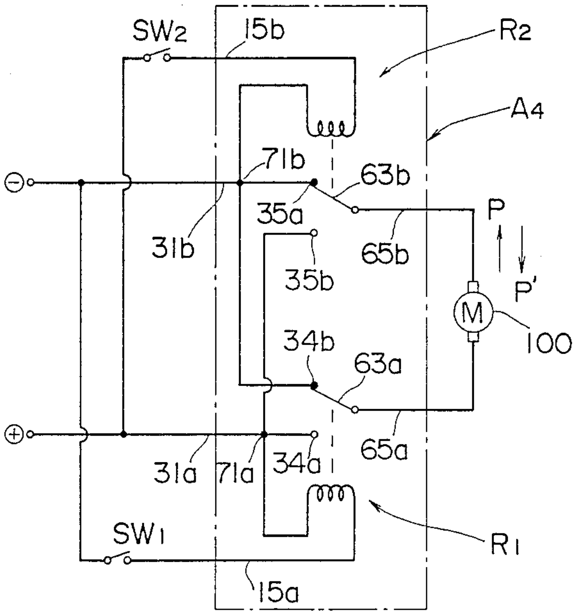
FIG. 10 is an electric circuit configuration of the electromagnetic relay of FIG. 9 which is connected to a motor.

FIG. 10 shows an electric circuit of the relay $A_4$ which is used to rotate the motor 100 in alternate directions.

When the switch $SW_1$ is turned on to activate the relay unit $R_1$, the current flows into the direction P to rotate the motor 100 in the forward direction. On the other hand, when the switch $SW_2$ is turned on to activate the relay unit $R_2$, the current flows in direction P' to rotate the motor 100 into the opposite direction.

In the foregoing embodiments, the relays A to $A_4$ are used to rotate the motor 100 in alternate directions. However, they can be used to activate polar solenoids in alternate directions. In addition, the terminal bases 21*a* and 21*b* may be made separately from the flanges 13*a* and 13*b*, mounted on the coil devices 10*a* and 10*b*, and fixed using the iron cores 51*a* and 51*b* along with the fixed contact unit 3. Moreover, the normally open and normally closed fixed terminals 31*a* and 31*b* along with the terminal grooves 22*a*, 22*b*, 23*a*, and 23*b* may be formed as shown in FIGS. 11*a* to 16 so that the terminals 31*a* and 31*b* can be precisely positioned and prevented from coming off easily from the terminal grooves.

Figure 11A:
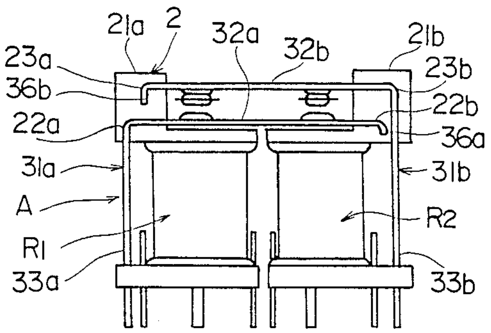
Figure 11B:
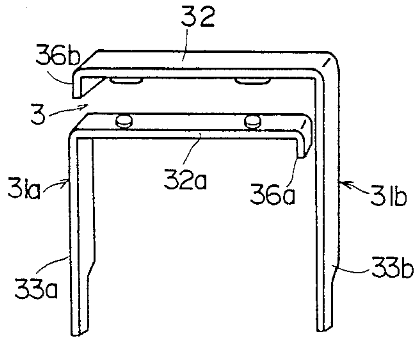

In FIGS. 11*a* and 11*b*, the tips of the flat portions 32*a* and 32*b* of the terminals 31*a* and 31*b* are bent downwardly to form protrusions 36*a* and 36*b*. The terminal bases 21*a* and 21*b* have recesses into which the protrusions 36*a* and 36*b* are fitted. In addition, the upper part of the perpendicular portions 33*a* and 33*b* can be pressed into the terminal grooves as well as the flat portions 32*a* and 32*b*.

Figure 12A:
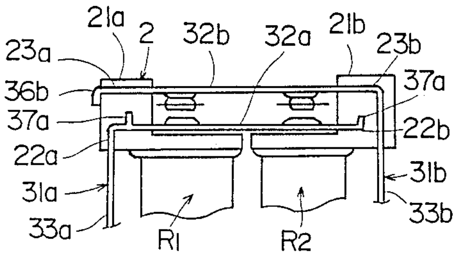
Figure 12B:
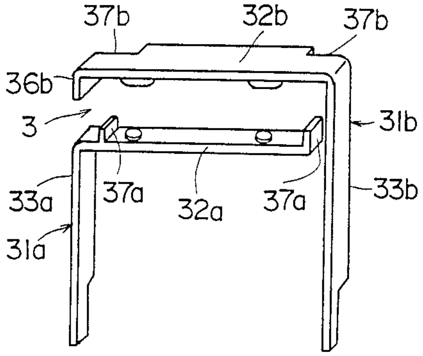

In FIGS. 12*a* and 12*b*, the terminal 31*a* has protrusions 37*a* and 37*a* extending upwardly. The terminal 31*b* has a protrusion 36*b* extending downwardly to engage the side of the terminal base 21*a* and steps 37*b* and 37*b* formed on the flat portion 32*b*. Also, the terminal base 21*b* has recesses, not shown, into which the protrusions 37*a* are fitted.

Figure 13A:
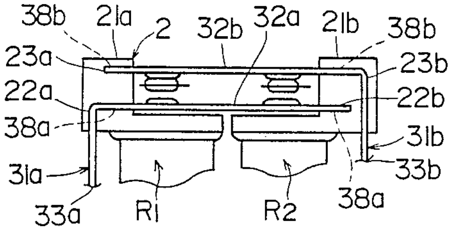
Figure 13B:
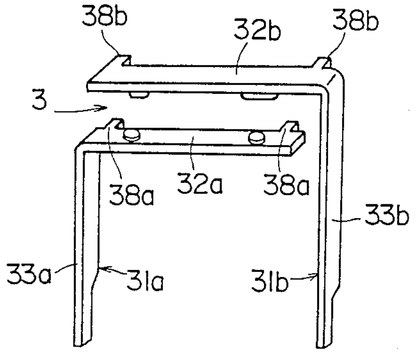

In FIGS. 13*a* and 13*b*, the flat portion 32*a* has protrusions 38*a* and 38*a* extending in the direction into which the terminal 31*a* is pressed. Also, the flat portion 32*b* has protrusions 38*b* and 38*b* extending in the same direction as that of the protrusions 38*a* and 38*a*. The grooves 22*a*, 22*b*, 23*a* and 23*b* have recesses, not shown, corresponding to the protrusions 38*a* and 38*b*.

Figure 14A:
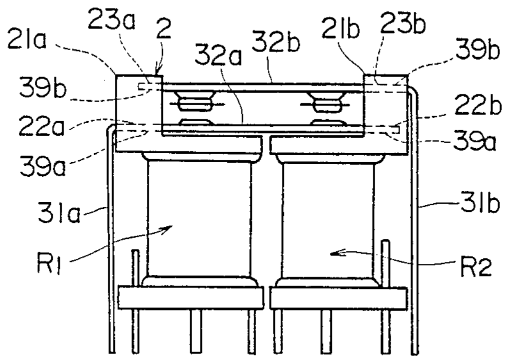
Figure 14B:
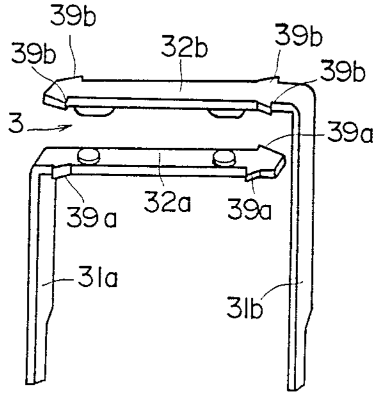

In FIGS. 14*a* and 14*b*, the flat portion 32*a* has protrusions 39*a* and the flat portion 32*b* has protrusions 39*b*, respectively. The grooves 22*a*, 22*b*, 23*a*, and 23*b* are formed from the rear side of the terminal bases 21*a* and 21*b*, and have recesses, not shown, corresponding to the protrusions 39*a* and 39*b*.

In FIG. 15, another terminal base 24 is formed to support the central parts of the flat portions 32*a* and 32*b*. Therefore, the distance between the flat portions 32*a* and 32*b*, that is, the stroke of the movable contacts 63*a* and 63*b* is kept constant, allowing the stable operation of the electromagnetic relay.

In FIG. 16, instead of the terminal base 21*a*, a small-sized terminal base 25*a* is formed to support only the normally open fixed contact 31*a*. Though the tip of the flat portion 32*b* is not supported by the base 25*a*, the relay can operate stably because the terminal base 24*a* supports around the central parts of the flat portions 32*a* and 32*b* to keep the stroke constant.

FIG. 17 shows an electromagnetic relay as still another embodiment of this invention. The flanges 11*a* and 12*a* are extended in the width direction.

The flange 11*a* has a recess 15*c* formed on the upper portion thereof, and the flange 12*a* has a recess 17*c* which is formed on the lower portion of the flange 12*a* opposing the recess 15*c*.

The electromagnet device 10*b* has the main frame 13*b*, and the flanges 11*b* and 12*b*. Wound around the main frame 13*b* is the coil 14*b* whose one end is connected to one of the coil terminals 19*b* and whose other end is to the other of the terminals 19*a*. The flanges 11*b* and 12*b* are slided into the recesses 15*c* and 17*c* to fix the device 10*b*, so that the distance between the coils 14*a* and 14*b* are kept constant and the operation of the relay is stable. The other constructions and assembly procedures are the same as those of the relay shown in FIG. 1.

In this embodiment, the terminal unit 20 is made separately from the flange 12*a*. However, as shown in FIG. 18, the flange 12*a* may include a terminal base 21*a* which has the terminal grooves 22*a* and 23*a*, and a terminal base 21*b* which has the terminal grooves 22*b* and 23*b*.

FIG. 19 shows an electromagnetic relay $A_5$ as another embodiment of this invention The relay $A_5$ has two relay units Ra and Rb which are made of a base 200, a contact unit 8, and two electromagnet devices 9a and 9b.

As shown in FIG. 20, the contact unit 8 has T-shaped normally closed and normally open fixed terminals 81 and 83. Normally closed fixed contacts 82a and 82b are disposed on the upper flat portion of the terminal 81, and normally open fixed contacts 84a and 84b are on the upper flat portion of the terminal 83, respectively. The distance between the contacts 82a and 82b is equal to that between the contacts 84a and 84b. A generally c-shaped common terminal 85a has two common contacts 86a opposing each other, and also a generally c-shaped common terminal 85b has two common contacts 86b opposing each other. The common terminal 85a is disposed on the left side of the terminals 81 and 83 in such a manner that the axis of the contacts 86a is in parallel with that of the contacts 82a and 84a. The common terminal 85b is disposed on the right side of the terminals 81 and 83 in such a manner that the axis of the contacts 86b is in parallel with that of the contacts 82b and 84b.

A movable contact member 87a supporting the movable contacts 88a and 89a is disposed so that the contact 88a can reciprocate between the fixed contacts 86a, and the contact 89 can reciprocate between the fixed contacts 82a and 84a. A movable contact member 87b supporting the movable contacts 88b and 89b is disposed so that the contact 88b can reciprocate between the fixed contacts 86b, and the contact 89b can reciprocate between the fixed contacts 82b and 84b.

When the electromagnet devices 9a and 9b are not activated, the movable contacts 88a and 89a contact with the fixed contacts 86a and 82a, and the movable contacts 87b and 88b contact with the fixed contacts 82b and 86b.

The electromagnet device 9a is made of an electromagnet 91a, a generally L-shaped yoke 95a, and a generally L-shaped movable iron member 96a. The electromagnet 91a is made of an iron core 92a, a spool 93a into which the iron core 92a is inserted, and a coil 94a which is wound around the spool 93a. The Yoke 95a is fixed to the electromagnet 91a, and the movable iron member 96a having a protrusion 97a is mounted on the electromagnet 91a so that it can rotate in the directions of a and a' around one end of the yoke 95a a supporting point, when a current is applied to the coil 94a. The construction of an electromagnet device 9b is the same as that of the electromagnet device 9a. The electromagnets 9a and 9b are activated independently from each other.

When the electromagnet 91a is energized, the movable iron member 96a is rotated in the a direction around one end of the yoke 95a, and the protrusion 97a pushes up the movable contact member 87a so that the movable contacts 88a and 89a can contact with the fixed contacts 86a and 84a, respectively. On the other hand, when the electromagnet 91b is energized, the movable contacts 88b and 89b of the movable contact member 87b contact with the fixed contacts 86b and 84b, respectively.

The distance between the common terminal 85a and the normally closed fixed terminal 81, and the distance between the common terminal 85a and the normally open fixed terminal 83 are adjusted according to the current level flowing through the terminals 81, 83 and 85a. For example, when a high-level current is used, the distance between the terminals 85a and 81, and the distance between the terminals 85a and 83 are set longer. This is true for the common terminal 85b. The distance between the contacts opposing each other, for example, 82a and 84a, need not be changed even if the current level is changed.

An application of the relay $A_5$ will be described hereinafter referring to FIGS. 22 to 24. FIGS. 22 to 24 show an application in which the relay $A_5$ is used to rotate the d.c. motor 100 in alternate directions.

As shown in FIG. 22, before the switches $SW_1$ and $SW_2$ are turned on, the normally closed fixed terminal 81 is connected to the plus terminal pt of a d.c. power supply, not shown, and the normally open fixed terminal 83 to the minus terminal mt. The common terminal 85a is connected to one pole of the motor 100, and the common terminal 85b to the other pole. One end of the coil 94a is connected to the minus terminal mt, and the other end is connected the plus terminal pt via the switch $SW_1$. In addition, one end of the coil 94b is connected to the minus terminal mt, and the other end is to the plus terminal pt via the switch $SW_2$.

In operation, when the switch $SW_1$ is turned on with the switch $SW_2$ turned off the electromagnet device 9a is activated. Thereby, the movable contacts 88a and 89a contact with the common contact 86a and the fixed contact 84a, connecting the normally open fixed terminal 83 to the common terminal 85a. Thus, an electric circuit as shown in FIG. 5 is provided. Consequently, the plus terminal of the power supply is connected to the one pole of the motor 100 via the terminal 83, the movable contact member 87a, and the common terminal 85a. Also, the minus terminal mt is connected to the other pole of the motor 100 via the terminal 81, the movable contact member 87b, and the terminal 85b. Therefore, an electric current flows in the direction P to rotate the motor 100 in the forward direction.

On the other hand, when the switch $SW_2$ is turned on with the switch $SW_1$ turned off, the electromagnet device 9b is activated. Thereby, the movable contacts 88b and 89b contact with the common contact 86b and the fixed contact 84b respectively, connecting the terminal 83 to the common terminal 85b. Thus, an electric circuit as shown in FIG. 6 is provided. Consequently, the plus terminal pt is connected to the other pole of the motor 100 via the terminal 83, the movable contact member 87b, and the terminal 85b. Also, the minus terminal mt is connected to the one pole via the terminal 81, the movable contact member 87a, and the terminal 85a. Therefore, the electric current flows in the direction P' to rotate the motor in the reverse direction.

In this embodiment, the movable contact members 87a and 87b are made separately from the electromagnet devices 9a and 9b, and moved by the protrusions 97a and 97b. However, as shown in FIG. 21, the member 87a may be fixed to the movable iron member 96a so that the member 87a can be moved together with the iron member 96a. Also, the member 87b may be fixed to the movable iron member 96b, not shown, so that the member 87b can be moved together with the iron member 96b.

It should be understood that the above description is merely illustrative of this invention and that many changes and modifications may be made by those skilled in the art without departing from the scope of the appended claims.

What is claimed is:

1. An electromagnetic relay comprising:

at least two electromagnetic devices, each having a coil device;

a pair of normally closed and normally open fixed terminals which are disposed opposing each other, said pair of fixed terminals being located on one side of said coil device;

at least two normally closed fixed contacts mounted on said normally closed fixed terminal;

at least two normally open fixed contacts mounted on said normally open fixed terminal, each of said normally open fixed contacts opposing each of said normally closed fixed contacts; and at least two movable contacts, each of which is reciprocated between said normally closed and open fixed contacts by activating and deactivating said electromagnetic device.

2. An electromagnetic relay according to claim 1, in which each device further comprises a pair of terminal bases for supporting said normally closed and normally open fixed terminals.

3. An electromagnetic relay according to claim 2, wherein each of said terminal bases has two grooves, into one of which said normally closed fixed terminal is fitted, and into the other of which said normally open fixed terminal is fitted.

4. An electromagnetic relay according to claim 2, wherein said normally closed and normally open fixed terminals have flat portions whose tips are bent downwardly to form protrusions, and said terminal bases have recesses into which said protrusions are fitted.

5. An electromagnetic relay according to claim 1, further comprising a terminal base for supporting around the central parts of said normally closed and normally open fixed terminals.

6. An electromagnetic device according to claim 1, wherein said electromagnet devices have two common flanges at both ends thereof which are extended in the width direction, one of said common flange has a first recess formed on the upper portion thereof and the other has a second recess formed on the lower portion thereof opposing said first recess, and one of said coil devices is slided onto said flanges through said recesses.

7. An electromagnetic relay comprising:

a normally closed fixed terminal having two normally closed contacts thereon;

a normally open fixed terminal having two normally open contacts, each of said normally open contacts opposing each of said normally closed contacts;

a pair of common terminals each of which has a pair of common contacts, one of said common terminals being disposed near one side of said normally open and said normally closed fixed terminals and the other of said terminals being disposed near the other side of said normally open and said normally closed fixed terminals;

first and second movable contact members each of which has two movable contacts, one of said movable contacts of each of said movable contact members being disposed between said normally closed and open contacts, and the other of said movable contacts of each of said movable contact members being disposed between said common contacts;

a first electromagnetic device for moving said first movable contact member to changeover an electric circuit; and a second electromagnetic device for moving said second movable contact member to changeover an electric circuit.

8. An electromagnetic relay according to claim 7 further comprising first and second movable iron members, said first movable iron member is rotatably mounted on said first electromagnetic device for moving said first movable contact member, said second movable iron member is rotatably mounted on said second electromagnet device for moving said second movable contact member.

9. An electromagnetic relay according to claim 1, wherein each device further comprises a terminal block on which each pair of normally closed and normally open fixed terminals is mounted, which terminal block is mounted within the relay substantially contiguously with the terminal block of the other device within said relay.

* * * * *